US012684002B2

(12) United States Patent
Barnes et al.

(10) Patent No.: US 12,684,002 B2
(45) Date of Patent: Jul. 14, 2026

(54) AUTOMATED CHANGING OF NETWORKING FOR TEMPORARY COMMUNICATION SYSTEMS

(71) Applicant: Wells Fargo Bank, N.A., San Francisco, CA (US)

(72) Inventors: Jillian Barnes, Columbia, SC (US); Justin Blackburn, Litchfield Park, AZ (US); Clementine Marie Valentine Buschtetz, Tempe, AZ (US); Jeffrey Couvrette, San Diego, CA (US); Jennifer Aber Holton, Clemmons, NC (US); Ryan Linn, Raleigh, NC (US); Radmila Oakley, Walnut Cove, NC (US); Jacob Donald Sheppard, Richfield, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 101 days.

(21) Appl. No.: 18/587,487

(22) Filed: Feb. 26, 2024

(65) Prior Publication Data

US 2025/0274473 A1 Aug. 28, 2025

(51) Int. Cl.
*G06F 21/57* (2013.01)
*G06F 21/50* (2013.01)
*H04L 9/40* (2022.01)

(52) U.S. Cl.
CPC ...... *H04L 63/1433* (2013.01); *H04L 63/0272* (2013.01)

(58) Field of Classification Search
CPC ........................ H04L 63/1433; H04L 63/0272
See application file for complete search history.

(56) References Cited

U.S. PATENT DOCUMENTS

| | | | |
|---|---|---|---|
| 8,069,471 B2 | 11/2011 | Boren | |
| 8,572,735 B2 | 10/2013 | Ghosh et al. | |
| 8,635,490 B2 | 1/2014 | Narayanaswamy et al. | |
| 9,426,834 B2 | 8/2016 | Greene et al. | |
| 9,454,592 B2 | 9/2016 | Mills et al. | |
| 9,501,541 B2 | 11/2016 | Doering et al. | |
| 9,906,500 B2 | 2/2018 | O'Hare et al. | |
| 10,225,269 B2 | 3/2019 | Yi | |
| 10,637,994 B2 | 4/2020 | Amin et al. | |
| 10,762,204 B2 | 9/2020 | Yuen et al. | |
| 10,904,288 B2 | 1/2021 | Robertson | |
| 2005/0154733 A1 | 7/2005 | Meltzer et al. | |
| 2006/0149842 A1 | 7/2006 | Dawson et al. | |

(Continued)

OTHER PUBLICATIONS

U.S. Appl. No. 17/930,207, filed Sep. 7, 2022.

(Continued)

*Primary Examiner* — Jeffrey C Pwu
*Assistant Examiner* — Helai Salehi
(74) *Attorney, Agent, or Firm* — Merchant & Gould P.C.

(57) ABSTRACT

An example computer system for providing a communication system can include: one or more processors; and non-transitory computer-readable storage media encoding instructions which, when executed by the one or more processors, causes the computer system to: monitor criteria associated with the computer system; calculate a risk score associated with the communication system; and automatically change one or more endpoints of the computer system when the risk score exceeds a threshold.

14 Claims, 11 Drawing Sheets

(56) References Cited

U.S. PATENT DOCUMENTS

| | | | |
|---|---|---|---|
| 2007/0210909 | A1 | 9/2007 | Addy |
| 2010/0306772 | A1 | 12/2010 | Arnold et al. |
| 2012/0131226 | A1 | 5/2012 | Stevens et al. |
| 2013/0189944 | A1 | 7/2013 | Mccoy |
| 2013/0295891 | A1 | 11/2013 | Moon et al. |
| 2014/0125759 | A1 | 5/2014 | Chalasani et al. |
| 2016/0219154 | A1 | 7/2016 | Veron et al. |
| 2017/0155590 | A1* | 6/2017 | Dillon ................. H04L 12/2867 |
| 2017/0279826 | A1 | 9/2017 | Mohanty et al. |
| 2017/0353978 | A1 | 12/2017 | Ulinskas |
| 2018/0054427 | A1 | 2/2018 | Revell |
| 2019/0147089 | A1 | 5/2019 | Megahed et al. |
| 2019/0320038 | A1 | 10/2019 | Walsh et al. |
| 2020/0358617 | A1 | 11/2020 | Baierlein et al. |
| 2022/0232510 | A1* | 7/2022 | Thaker ................. H04W 16/18 |
| 2022/0239568 | A1 | 7/2022 | Celozzi et al. |
| 2022/0278874 | A1* | 9/2022 | Gabay ................. H04L 63/0272 |
| 2024/0223590 | A1* | 7/2024 | Northern ............. H04L 63/1433 |

OTHER PUBLICATIONS

U.S. Appl. No. 18/333,913, filed Jun. 13, 2023.
U.S. Appl. No. 18/347,789, filed Jul. 6, 2023.
U.S. Appl. No. 18/523,566, filed Nov. 29, 2023.
Noel Burton-Krahn, HotSwap Network Solutions, pp. 205-212 of the Proceedings of LISA '02: Sixteenth Systems Administration Conference, (Berkeley, CA: USENIX Association, 2002), 8 pages.

* cited by examiner

400

500

114

600

114

110

Networking engine
802

Risk modeling engine
804

Figure 9:
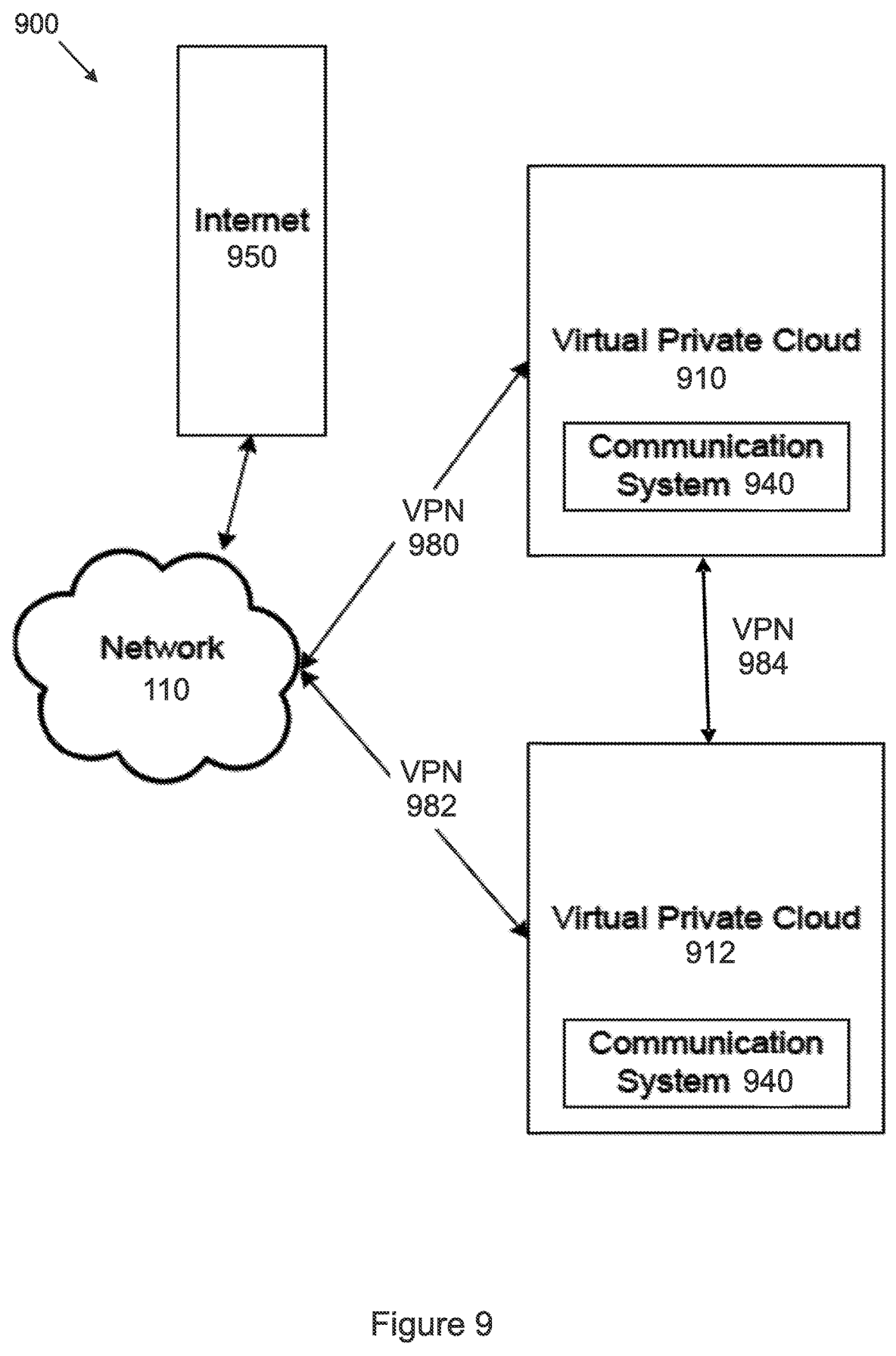

900

Internet
950

Network
110

VPN
980

VPN
982

VPN
984

Virtual Private Cloud
910

Communication
System 940

Virtual Private Cloud
912

Communication
System 940

Endpoint engine  1002

Risk modeling engine 1004

Figure 10

AUTOMATED CHANGING OF NETWORKING FOR TEMPORARY COMMUNICATION SYSTEMS

RELATED APPLICATION(S)

This patent application is related to U.S. patent application Ser. No. 18/523,566 filed on Nov. 29, 2023, U.S. patent application Ser. No. 17/930,207 filed on Sep. 7, 2022, U.S. patent application Ser. No. 18/333,913 filed on Jun. 13, 2023, and U.S. patent application Ser. No. 18/347,789 filed on Jul. 6, 2023, the entireties of which are hereby incorporated by reference.

BACKGROUND

Cyber security events can disrupt internal communications within an entity, such as email, instant messaging, video conferencing, etc. Worse yet, an attack can be on the communication system itself. For instance, an attacker may have control of an email system, which would render it impossible for users to communicate securely to resolve an event. In addition, documentation systems may contain the exact architectural layouts of systems, telling intruders how to prevent engineers from stopping attackers. This can make remediation of such an attack challenging.

SUMMARY

Examples provided herein are directed to automated changing of networking used for temporary self-provisioning communication systems.

According to aspects of the present disclosure, an example computer system for providing a communication system can include: one or more processors; and non-transitory computer-readable storage media encoding instructions which, when executed by the one or more processors, causes the computer system to: monitor criteria associated with the computer system; calculate a risk score associated with the communication system; and automatically change one or more endpoints of the computer system when the risk score exceeds a threshold.

The details of one or more techniques are set forth in the accompanying drawings and the description below. Other features, objects, and advantages of these techniques will be apparent from the description, drawings, and claims.

DESCRIPTION OF THE DRAWINGS

FIG. 9 shows another example system for providing temporary communication services.

FIG. 10 shows example logical components of a network of the system of FIG. 9.

DETAILED DESCRIPTION

This disclosure relates to temporary self-provisioning communication services. In the examples provided herein, the communications services allow personnel of an entity to communicate in a secure and reliable manner during a cyber security event.

For instance, during a cyber security event, one or more systems of an entity, such as a business, can be compromised. The impacted systems can include the communication systems of the business. In order to remediate the effects of the cyber security event, personnel of the business need a secure manner by which to communicate. To accomplish this, the communication systems described herein provide a temporary and secure way for the personnel to communicate.

In some examples, the temporary self-provisioning communication services can be secured (e.g., by Transport Layer Security (TLS)) and update-to-date on all patches. The communication services can be standalone (e.g., not relying on other infrastructure to function) and ideally untraceable to the entity. Further, the communication services can be deployed and removed as a single bundle. Other possible characteristics of the communication services include the ability to manage users (including changing of passwords) and be auditable.

In some implementations, the communication services can be implemented on a cloud-based architecture or on physical hardware. The communication services can be implemented on virtual machines. Further, aspects of the communication services are ideally non-attributable to the entity. For instance, any billing associated with the communication services, such as hosting costs, are handled in a manner that is not attributable to the entity. Further, the Domain Name System (DNS) aspects of the communication system, including registration and certificate, are ideally non-attributable to the entity.

In this manner, the example communication services described herein provide a secure and temporary manner by which personnel can communicate during a cyber security event.

Figure 1:
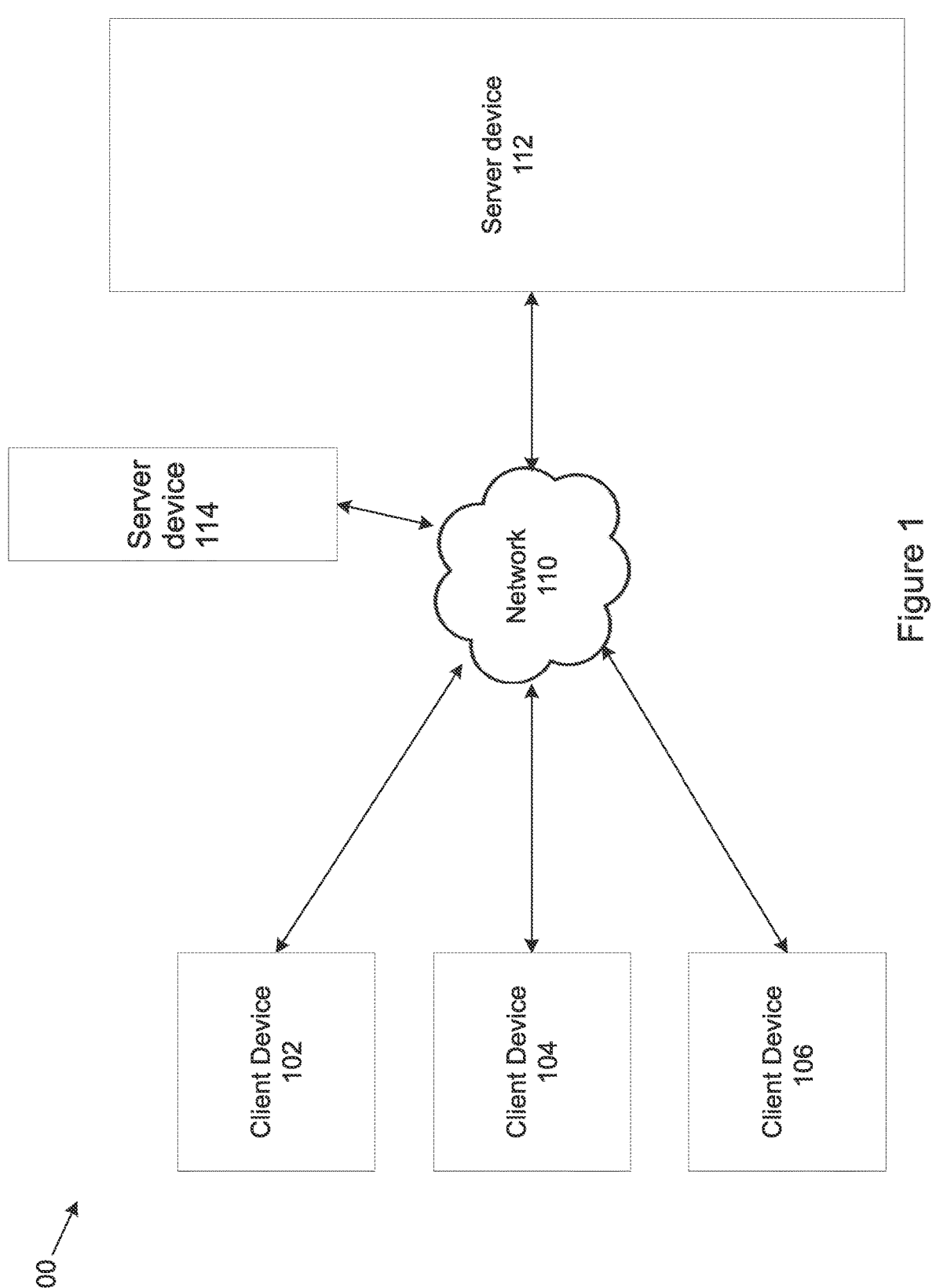
FIG. 1 shows an example system for providing temporary communication services.

FIG. 1 schematically shows aspects of one example system 100 for an entity. The entity can be any type of business. In one non-limiting example, the entity is a financial institution that provides financial services to customers. However, the concepts described herein are equally applicable to other types of entities.

Generally, the system 100 can be a typical computing environment that includes a plurality of client devices 102, 104, 106 and a server device 112. The client devices 102, 104, 106 communicate with the server device 112 to accomplish business tasks.

Each of the client devices 102, 104, 106 and the server device 112 may be implemented as one or more computing devices with at least one processor and memory. Example computing devices include a mobile computer, a desktop computer, a server computer, or other computing device or devices such as a server farm or cloud computing used to generate or receive data.

In the examples shown, the client devices 102, 104, 106 can be used by customers or employees of the business to conduct business. For instance, the client devices 102, 104, 106 can communicate with the server device 112 through a network 110. The server device 112 can be programmed to deliver functionality to the client devices 102, 104, 106. For example, in one embodiment, the server device 112 is one or more computers (typically a server farm or part of a cloud computing environment) that facilitates the various business processes of the entity, along with providing communication services like email, instant messaging, video conferencing, etc.

When a cyber security event occurs, one or more of the client devices 102, 104, 106 and/or the server device 112 can be compromised. An example of such a cyber security event includes a third party (e.g., a malicious actor) gaining access to functionality of the server device 112 through social engineering, an exploit, etc. Once compromised, the functionality provided by the server device 112, including the communication services, may not be trusted.

To remediate the cyber security event, it may be necessary for the entity to perform various actions on the server device 112, including possibly removing accounts, restoring data and programs, reformatting disks, etc. This could impact the communication services provided by the server device 112, further complicating the remediation tasks.

Figure 2:
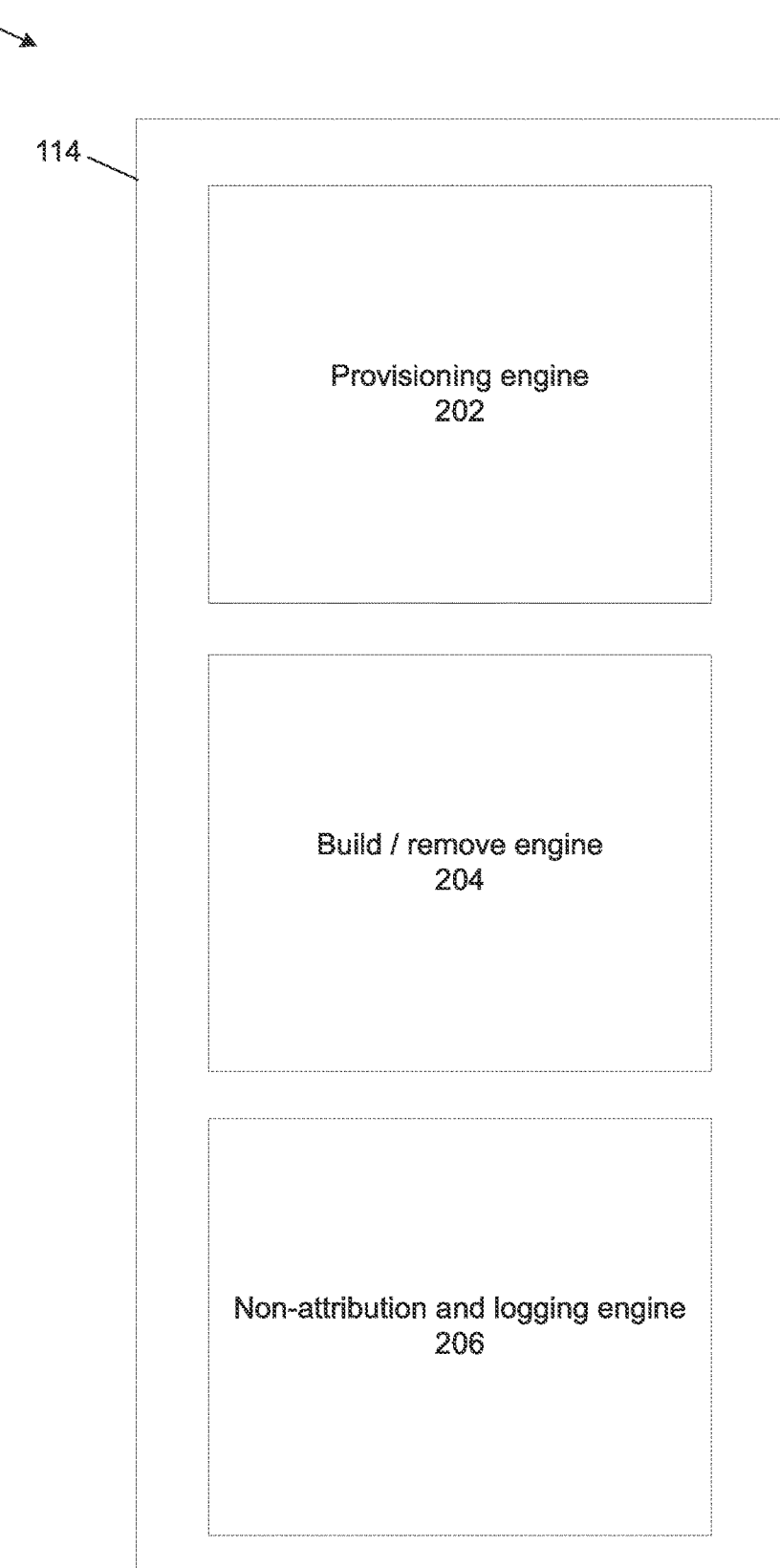
FIG. 2 shows example logical components of a communication system of the system of FIG. 1.
Figure 3:
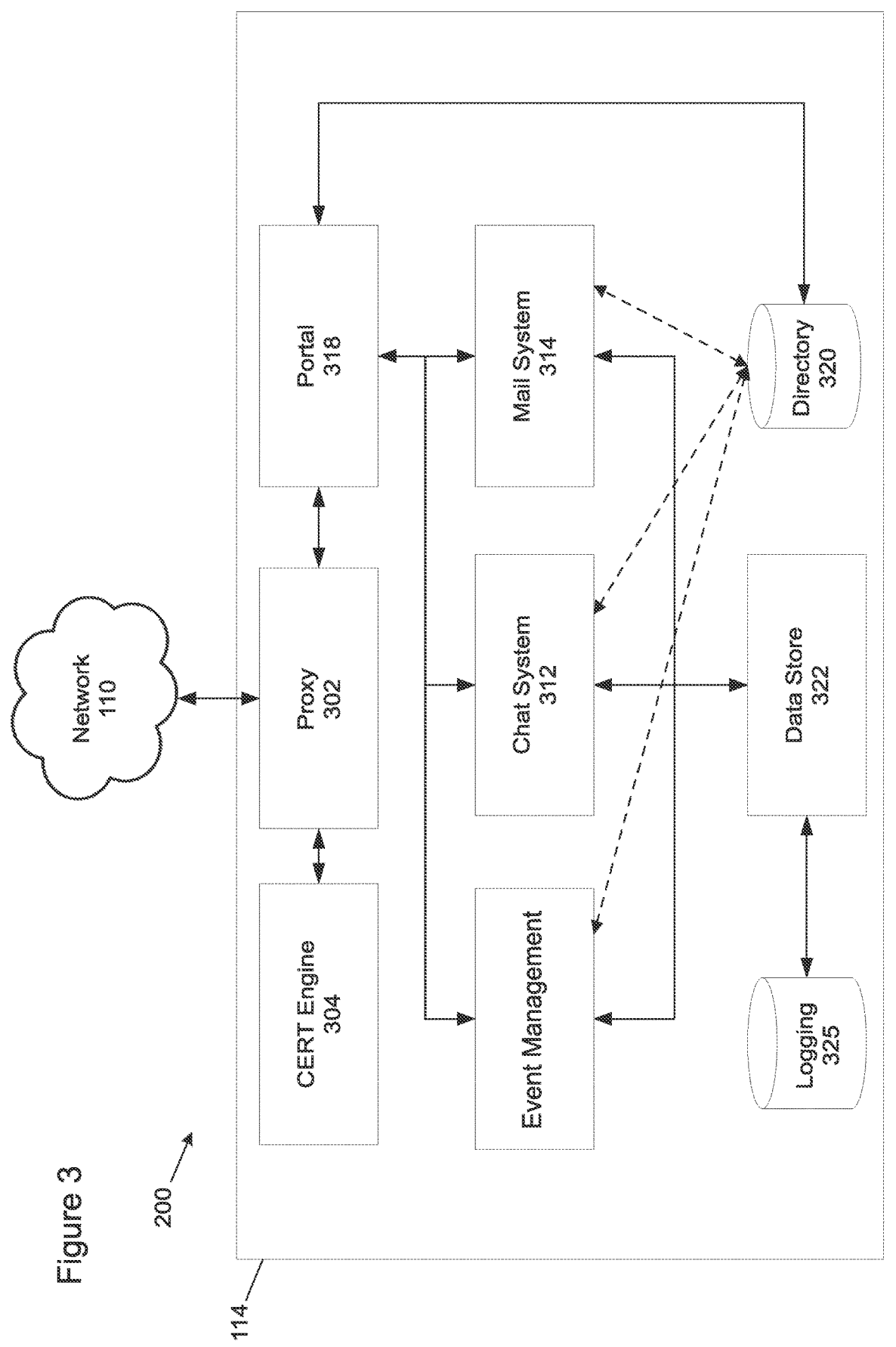
FIG. 3 shows an example logical view of the communication system of FIG. 2.

Referring now to FIGS. 1-3, due to the breach of trust and possible interruptions in the communication services for the server device 112, a separate server device 114 is provisioned that is generally programmed to provide a temporary self-provisioning communication system 200. In generally, the communication system 200 is programmed to provide communication services between the client devices 102, 104, 106 during a cyber security event.

In this example, the server device 114 is hosted by an entity that is ideally unassociated with the entity owning the system 100. For instance, the server device 114 can be a cloud computing resource hosted by a third party, such as Amazon Web Services, Google Cloud Platform, or Microsoft Azure.

The communication system 200 can be container-based such that it can be run on a variety of platforms, including physical servers, virtual machines, and cloud-computing environments. This allows the communication system 200 to use micro-services to implement functionality. For instance, each application of the communication system 200 can be a sub-contained microservice that communicates with the other services of the communication system 200. This allows the microservices to work within any cloud environment and be transportable, such as by moving one or more of the microservices to a different hosting location. Examples of such container-based solutions include, without limitation: Kubernetes, Docker, Podman, rtk, Containerd, etc.

In this example, the communication system 200 is executed on a virtual machine running on the server device 114. The communication system 200 can include a provisioning engine 202, a build/remove engine 204, and a non-attribution and logging engine 206.

The example provisioning engine 202 is programmed to handle all the provisioning of the communication system 200. In one example, the provisioning engine 202 uses an infrastructure as code tool such as Terraform from HashiCorp to build and provision the communication system 200 on the server device 114.

This provisioning by the provisioning engine 202 can include everything from the DNS to container infrastructure to gathering the containers, etc. The provisioning can also include user load, the container interconnection, the proxy server with NGINX, the certificates, the microservices interconnection, and the combination of containers/OpenSSL backend with OpenSSL user maintenance that allows singular provisioning of the entire solution from creation ("ripcord standup") to removal ("ripcord teardown").

For instance, to provision users for the communication system 200, the provisioning engine 202 can be programmed to access a user directory, such as the user directory of the system 100 for the entity. The provisioning engine 202 sends out a communication, such as an email or text, to a subset of the users in that directory, as defined by one or more attributes stored in the directory.

For instance, a subset of the users in the directory can be defined as "key" entries that should be provisioned in the communication system 200 upon the occurrence of a cyber security event. Examples of such users include leadership, managers, and IT personnel. These key users can include contact information that can be used to provision the users on the communication system 200 when needed.

For instance, the communication to these key users is ideally sent to a non-attributable email address for each of the users. Within the communication, an address such as a Uniform Resource Locator (URL) is provided to locate the communication system 200. In this example, the location is domain non-attributable to the entity. The communication also can include initial credentials for the user on the communication system 200, such as the user's username and initial password. Once the user accesses the URL and provides the username and initial password, the user can setup a new password and access the resources provided by the communication system 200, including such functions as email, chat, and event management. Many other configurations are possible.

The example build/remove engine 204 is programmed to build and remove the communication system 200. In one embodiment, the communication system 200 can be built and removed with minimal manual effort. For instance, the communication system 200 can provide a "single click" to initiate the building and provisioning of the communication system 200. Once the single click request is made, the provisioning engine 202 can be programmed to execute and provision the communication system 200.

Further, a single click can be used to remove the communication system 200 once the communication system 200 is no longer needed, such as after the cyber security event has been mitigated. Once the single click is received by the build/remove engine 204, the entirety of the communication system 200 is deleted from the server device 114. This includes all accounts and data associated with the communication system 200 being scrubbed from the server device 114. Further, the DNS entries associated with the communication system 200 are removed, and any billing associated with the communication system 200 is ceased.

In some examples, the single click can be the selection of an installation file that is executed. Upon receipt of execution, the communication system 200 is automatically installed and provisioned. In another example, the single click can be a control on a graphical user interface, such as a button on a portal webpage. Once selection of the control is received, the communication system 200 is automatically installed and provisioned. Other configurations are possible.

The example non-attribution and logging engine 206 is programmed to facilitate the communication system 200 while minimizing the public connection between the communication system 200 and the entity. Billing associated with the communication system 200, such as hosting and registration costs, can be associated with a third party entity that is unrelated to the entity owning the system 100.

For instance, the billing for the hosting services for the server device 114 can be done through a third party so that the public does not know that the entity leasing the server device 114 is the entity. Purchases can be done in cash or through other non-traceable payment mechanisms, if needed. All interaction between the cloud-based provider and the entity can be done out-of-band to preserve the anonymity of the resources running on the server device 114. Many other configurations are possible.

The non-attribution and logging engine 206 can also be programmed to log the activities on the communication system 200. For instance, the non-attribution and logging engine 206 can be programmed to do offsite logging through log streaming using the Apache Kafka (or other) distributed events streaming platform. Further, in this example, log analytics for the communication system 200 can be done using the Elastic Stack log data resources. These analytics can include full backups and migration to other servers. Many other tools can also be used. Additionally, the logging engine could be configured to archive logs as necessary to comply with regulatory or other requirements applicable to the entity.

Referring now to FIG. 3, additional details on the communication system 200 are shown. Generally, the communication system 200 can include one or more of the following.

The communication system 200 can include a proxy 302, such as a NGINX web server. The communication system 200 can also include a certificate engine 304 that auto-provisions SSL certificates.

The communication system 200 can further including a backend set of microservices, including one or more of the following: an event management system 310, a chat system 312; and a mail system 314.

The example information and event management system 310 is a stand-alone microservice that manages and streamlines the process of issue resolution for the system 100. More specifically, the event management system 310 provides tracking of items associated with the mitigation of the cyber security event (as well as any other desired issues). In this example, the event management system 310 logs various aspects of each issue, including such information as the context of each issue, along with other data like category of issue, priority of issue, status of issue, etc. The event management system 310 can therefore provide documentation of a particular problem, its current status, and other associated information.

The example chat system 312 is a stand-alone microservice that provides messaging services for the users of the communication system 200. In one example, the chat system 312 includes instant messaging services that allow users to send and receive messages. Other features, like delivery confirmations and read receipts can be provided. Further, in some examples, features like messaging lists and self-destructing or ephemeral messages can be sent. In yet other embodiments, the chat system 312 can provide audio/visual messaging services, too. For instance, the chat system 312 can be programmed to provide audio and/or video conferencing for users. Many configurations are possible.

The example mail system 314 is a stand-alone microservice that provides electronic mail services. In this example, the mail system 314 can provide all the typical services of a mail system, such as sending and receiving of emails, calendaring, contacts, tasking, etc. The mail system 314 can be programmed to synchronize with standard mail clients, if desired. In yet other embodiments, the mail system 314 can include alternative features, such as self-destructing or ephemeral messages. Many configurations are again possible.

In this example, an example portal 318 is provided to allow the users to easily access the event management system 310, the chat system 312, and the mail system 314. For instance, because each of the event management system 310, the chat system 312, and the mail system 314 is implemented as a separate microservice, the microservices can be executed in disparate locations or even moved over time. The portal 318 provides a single place where a user can access information for each of the microservices.

For instance, the users can access the portal 318 using a URL provided to the users upon provisioning. Upon authentication, the portal 318 provides links to each of the microservices, including the event management system 310, the chat system 312, and the mail system 314. If the location for one or more of the microservices is changed, the portal 318 can be updated to reflect the new location. For instance, current URLs for each of the microservices can be provided on the portal 318.

The communication system 200 can include a directory 320, such as OpenLDAP, which is an open source implementation of the Lightweight Directory Access Protocol (LDAP). This can include a password change system, a persistent data store (e.g., data store 322), and a centralized logging system (e.g., logging store 325). Users can be provisioned via the LDAP. All system passwords can be stored in encrypted config files separate from the code base for the communication system 200.

The data associated with the communication system 200 can be stored in the data store 322. In some examples, the data store 322 can be a database associated with the server device 114. The example data store can store such data as the communications flowing through the communication system 200, event associated with the communication system 200, etc. Additionally, data store 322 could be configured to implement encryption-at-rest, data classification requirements, or other requirements necessary based on the data contained and/or regulatory or other requirements applicable to the entity.

Further, the logging aspects for the communication system 200 can be captured by the logging store 325. In some examples, the logging store 325 can be stored on the server device 114 or perform logging remotely, as described above. Many configurations are possible.

As previously noted, the communication system 200 is non-attributable to the entity. This can be accomplished through a single billing account through third party obscured backend billing.

The communication system 200 can include infrastructure as code stored in a code repository, such as one provided by GitHub, Inc., for both Terraform and all subcomponents. The code will run on a Virtual Machine running a container program that is auto-provisioned using Terraform.

There can be a static Internet Protocol (IP) address that is auto-provisioned via Terraform via the cloud hosting provider (e.g., the server device 114). There can be four DNS addresses assigned (mail, chat, event management, password change) that point to the static IP (A Records), plus an MX record for the mail server to send and receive mail (this can be done via Terraform via the cloud hosting provider).

In this configuration, the communication system 200 can be deployed and removed efficiently. As previously noted, it is possible to "pull the ripcord" through minimal manual involvement (e.g., one click) to setup the communication system 200 in an emergency, such as the cyber security event. Likewise, it is possible to "pull the ripcord" to remove or otherwise destroy the communication system 200 when no longer needed. This results in the communication system 200 being an ephemeral self-provisioning discrete communication system with mail, event management, and asynchronous communication.

Figure 4:
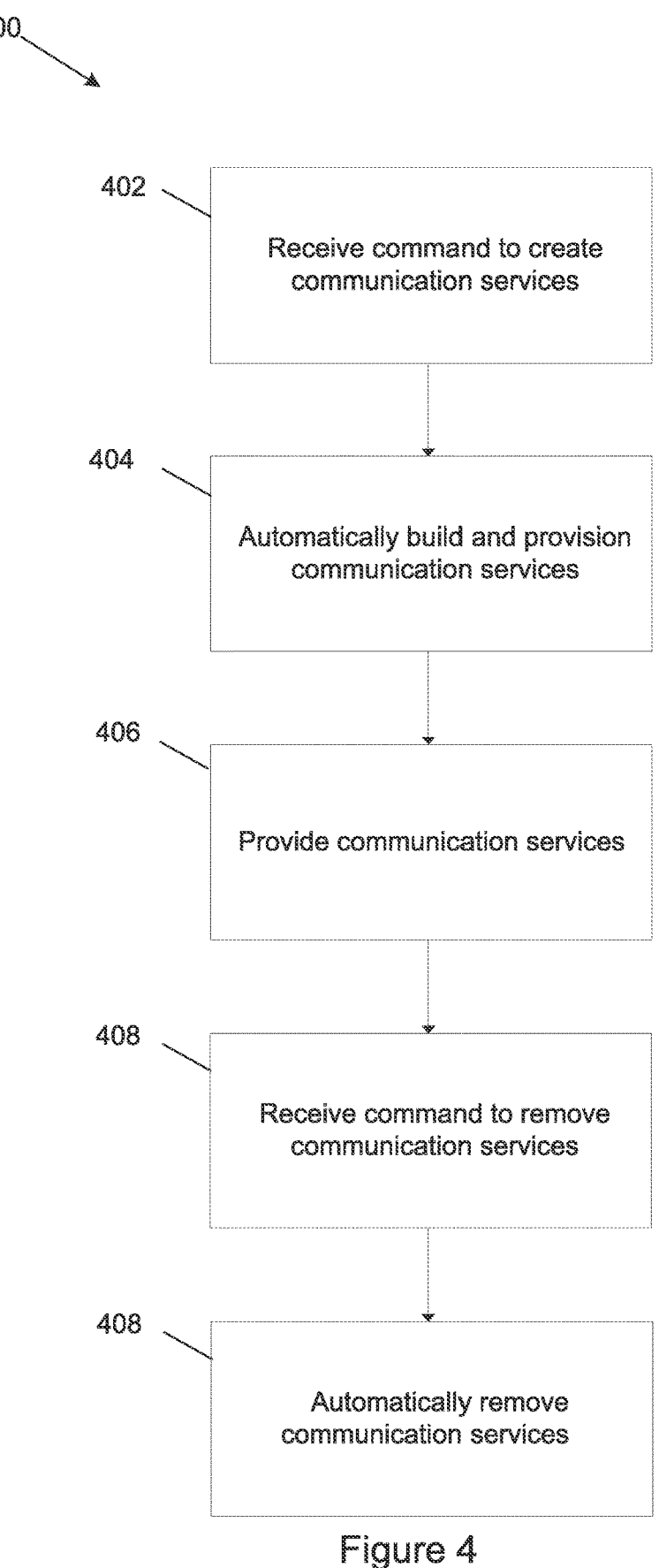
FIG. 4 shows an example method implemented by the system of FIG. 1.

Referring now to FIG. 4, an example method 400 for providing communication services is shown.

At operation 402, a command is received to create the communication services. As noted, this command can be as simply as the pushing of a button upon the identification of a cyber security event. Or, as detailed further below, the command can be automatically generated upon a certain event.

Next, at operation 404, the communication services are automatically built and provisioned. As noted, this can occur on a server that is not attributed to the entity.

Next, at operation 406, communication services are provided. This can include, without limitation, mail, chat, video conferencing, and/or event management.

Next, at operation 408, a command is received for removing the communication services. Similarly, the command can be as simply as clicking a button. This can occur, for instance, when normal communications have been restored for the entity.

Finally, at operation 408, the communication services are removed. This can be accomplished many ways, such as by deleting all the components of the communication services and ending the billing associated with the server space.

In another example, the command to create the communication services (for instance, at operation 402) can be initiated automatically. In such a scenario, assume an event that is sensed by the system 100 as being significant enough to automatically initiate the creation of the communication system 200. For instance, a catastrophic event, such as a ransomware attack, could automatically be sensed by the system 100, and the system 100 can be programmed to automatically initiate (e.g., according to a specific protocol) a non-attributable signal to create the communication system 200.

In such an example, the system can be programmed to scan the components of the system 100 and automatically generate containers and other cloud-based resources configured to identify possible adversaries and/or incidents. These containers can automatically create events and use technology, such as webhooks, to communicate the events.

All this can be driven through Artificial Intelligence (AI), with the AI growing more complex as more events are encountered. In such a scenario, the system can generate its own events and automatically notify the relevant parties of the events and possible remediation steps to address them.

Figure 5:
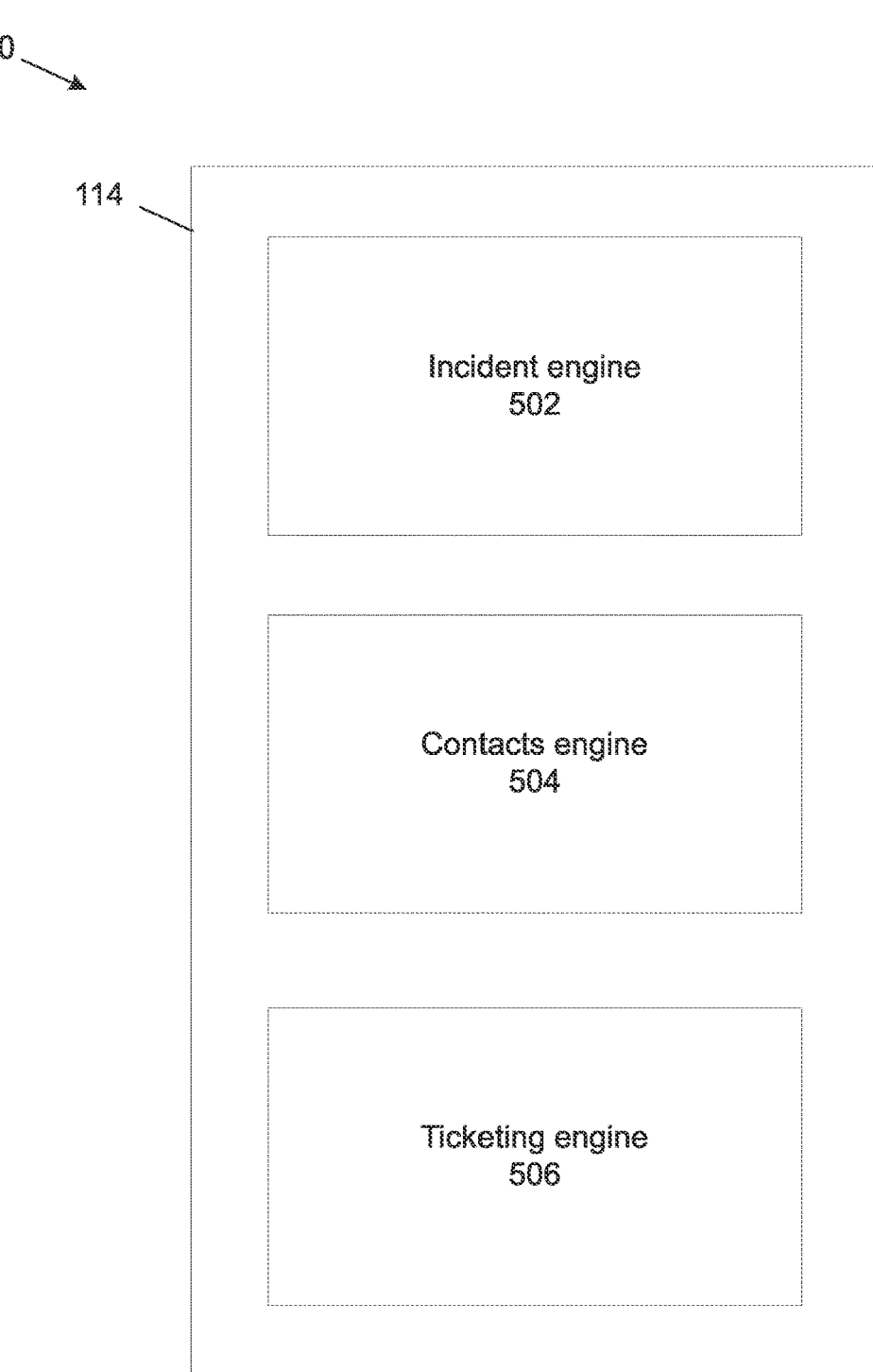
FIG. 5 shows example logical components of another communication system of the system of FIG. 1.

Referring now to FIG. 5, another embodiment of an example temporary self-provisioning communication system 500 created by the server device 114 is provided. The temporary self-provisioning communication system 500 is configured in a manner similar to the communication system 200 described above. However, in this instance, the server device 114 is also programmed to automatically provision various additional aspects of the temporary self-provisioning communication system 500 upon creation.

For instance, once the server device 114 is triggered to create the temporary self-provisioning communication system 500, a prewritten set of tickets, stored in a format such as Extensible Markup Language (XML) or JavaScript Object Notation (JSON), can be used to provision one or more of the event management system 310, the chat system 312, and the mail system 314.

This provisioning can include information about the specific event, contacts for users who are to be notified, and possible information about mitigation efforts. For example, the server device 114 can include trigger mechanisms for the various types of incidents as well as the groups/users who would be responsible for responding to each of the tickets associated with the mitigation efforts. The information for these individuals could be automatically loaded into the communication system 500 upon the trigger by the server device 114, as described below.

Specifically, the example server device 114 can include (in addition to the functionality described above for the server device 114 to instantiate the temporary self-provisioning communication system 200), an incident engine 502, a contacts engine 504, and a ticketing engine 506. These potential additional components of the server device 114 can be used to automatically provision the communication system 500 upon trigger and then automatically decommission the communication system 500 when the event is resolved.

In the example shown, the incident engine 502 is programmed to receive information about the cyber security event when the communication system 500 is created. For instance, the incident engine 502 can receive information from the server device 112 about the triggering cyber security event. In one example, the incident engine 502 can receive information about the event through APIs from various components of the system 100. In other examples, the incident engine 502 can also receive information about the cyber security event from third party systems.

Based on the triggering cyber security event, the incident engine 502 is programmed to identify and execute scripting to automate the provisioning of the communication system 500 to help remediate the event. In one example, a hierarchical JSON list is used to develop a series of tickets that are prepopulated with information based upon the type of event. The incident engine 502 analyzes the specific cyber security event that triggered the creation of the communication system 500 and selects one or more event types from the JSON list. These event types are then used to automate the provisioning of aspects of the communication system 500, such as prepopulating contacts, generating tickets for resolution of the event, etc.

For instance, assume that the incident engine 502 is prepopulated with a hierarchical list of possible events, including an event type A and an event type B.
1. Event Type A
   a. Triggering event: DDoS attack
   b. Contact list: contact list A
   c. Ticket list: ticket list A
2. Event Type B
   a. Triggering event: Unix attack
   b. Contact list: contact list B
   c. Ticket list: ticket list B The incident engine 502 is programmed to transverse the list and select the event type that matches the specific cyber security event. For instance, if the system 100 experiences a DDoS attack, the incident engine 502 is programmed to receive information about the attack and automatically select the "Event Type A" from the list by matching the triggering event to the event type.

If there is no matching event type in the list, the incident engine 502 can be programmed to select the closest matching event. Or, in some examples, the list can include one or more generic event types that can be used to provision the communication system 500 when a triggering cyber security event is not specifically addressed in the list. Many other configurations are possible.

The example contacts engine 504 is programmed to use the contact list A of the Event Type A to prepopulate groups and/or users in the chat system 312 and/or the mail system 314. In one example, the contacts engine 504 can receive a list of user names and use the LDAP to access contact information from the server device 112 for those users. There can be a hierarchy of user based upon the event types.

For instance, there can be a series of loops that are used to select users based upon the contact list A. In the instance of a DDoS attack, the groups and specific contacts who are responsible for DDoS data security can be included in the list and automatically provisioned in the communication system 500. Once provisioned, the users can be notified as described above to create the necessary accounts on the communication system 500.

The example ticketing engine 506 is programmed to use the ticket list A to automatically provision the event management system 310 with one or more tickets that are specific to the remediation of the cyber security event. This can include both automatic generation of the tickets and/or assignment of the tickets to one or more users as populated by the contacts engine 504. Through changes in status, the tickets can be automatically assigned priorities and updated appropriately.

For instance, for the event type A associated with a DDoS attack, tickets can be generated to identify which system(s) were breached and to reset credentials for the users of those systems. In such an example, the ticketing engine 506 is programmed to automatically generate those tickets within the event management system 310. Further, those tickets can be assigned to individuals designated by the contacts engine 504 to handle those types of tickets. As described above, the event management system 310 can thereupon be used to track the status of the tickets throughout the mitigation of the cyber security event.

Once the cyber security event has been mitigated, the entirety of the communication system 500 can be deleted from the server device 114, as described above. This includes all accounts and data associated with the communication system 500 being scrubbed from the server device 114. Further, the DNS entries associated with the communication system 500 are removed, and any billing associated with the communication system 500 is ceased.

Figure 6:
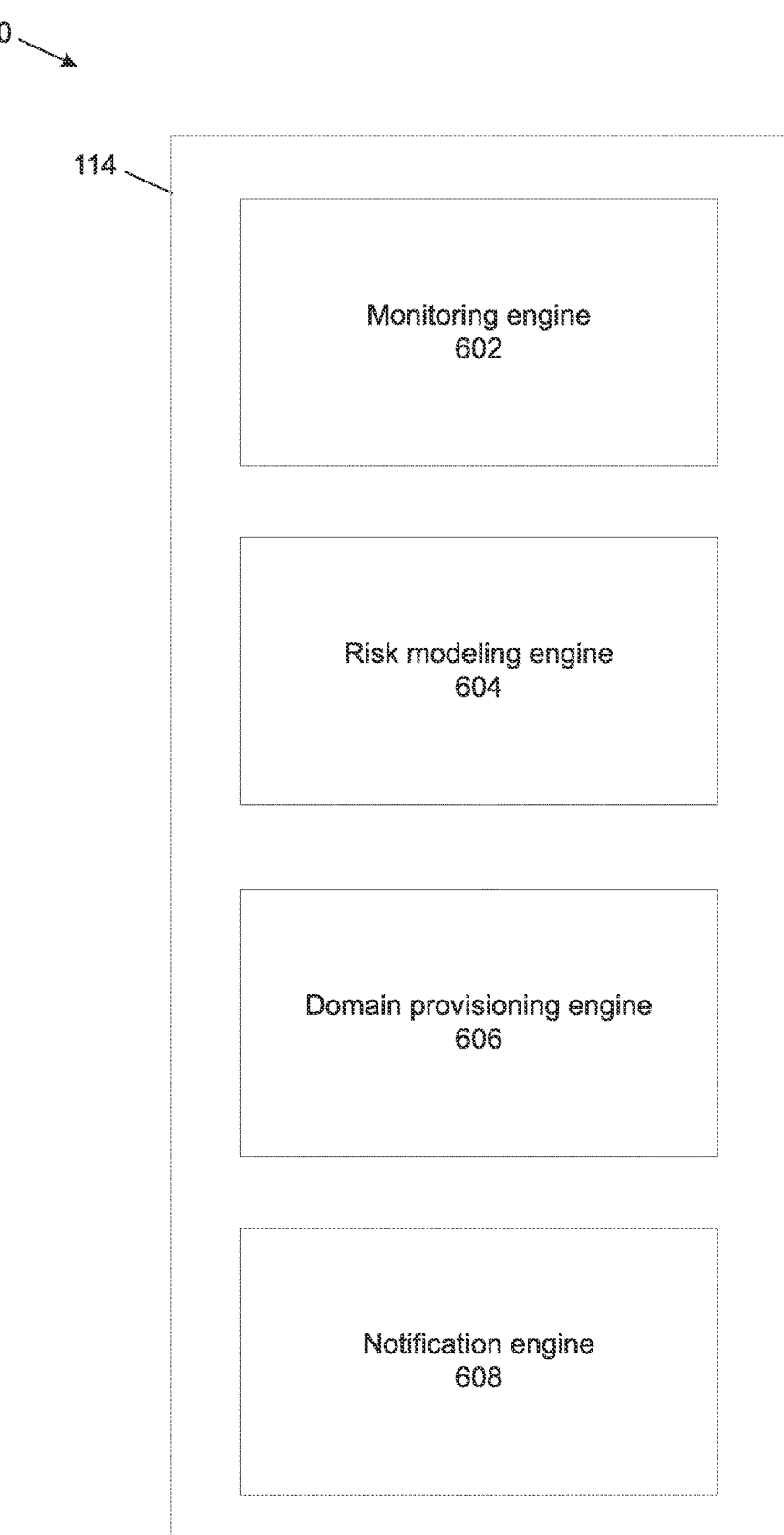
FIG. 6 shows example logical components of another communication system of the system of FIG. 1.

Referring now to FIG. 6, another embodiment of an example temporary self-provisioning communication system 600 created by the server device 114 is provided. The temporary self-provisioning communication system 600 is configured in a manner similar to the communication systems 200 and 500 described above. However, in this instance, the server device 114 is also programmed to automatically change the addresses for the communication system 600 when certain criteria are met.

For instance, as noted previously, there can be a static Internet Protocol (IP) address that is provisioned for the server device 114. There can be various DNS addresses assigned (e.g., mail.domain.com, chat.domain.com, etc.) that point to the static IP, plus an MX record for the mail server to send and receive mail for the communication system 600.

It some instances, it can be desirable to have a mechanism to determine when the communication system 600 is compromised. For instance, there may become a point at which the IP/DNS addresses (e.g., chat.domain.com, mail.domain-.com, etc.) have become stale and/or risk compromise by an adversary. This can become an issue when they may become attributable, such as if users are routinely logging into them via business devices or from IP addresses associated with the business or when consistent attacks on the communication system 600 are detected (e.g., hacked emails, phishing attacks, etc.).

A decision to change to a new address can be made under a predetermined set of criteria. Such criteria can include at a periodic timeframe (even if there are little or no adverse events), can be automated, and can ideally require minimal manual intervention by users. The existing data can be automatically ported between the old and new domains upon such a change (e.g., chat.domain1.com to chat.domain2.com, mail.domain1.com to mail.domain2.com, etc.).

In one example, the communication system 600 can combine various criteria (such as the length of time the system has been used, the number of people using it, from where it is being accessed, etc.) to produce a risk scoring model. When indicated by the model, the addresses for the communication system 600 can be changed.

The provisioning of the new addresses can be automated by shifting the domain over via creating a new domain on the fly, provisioning a new static IP, making a copy of all the data then changing any domain specific variables, then sending messages with the addressing to all users along with a requirement to change each password. These details are provided below. The previous domain can be rapidly deprovisioned with no loss in data for the communication system 600.

Specifically, the example server device 114 can include (in addition to the functionality described above for the server device 114 to instantiate the temporary self-provisioning communication system 200 and/or automatically provision the temporary self-provisioning communication system 500), a monitoring engine 602, a risk modeling engine 604, a domain provisioning engine 606, and a notification engine 608. These potential additional components of the server device 114 can be used to automatically change the addresses for the communication system 600.

In the example shown, the monitoring engine 602 is programmed to monitor various criteria associated with the communication system 600 that may be relevant to determining when to change the addresses for the communication system 600. For instance, monitoring engine 602 can be programmed to generally track such criteria as: (i) how long the communication system 600 has been active; (ii) how many users are accessing the communication system 600; and/or (iii) from where the communication system 600 is being accessed.

For instance, the monitoring engine 602 examines the type and length of the cybersecurity event. If the event is severe, the time between changing of the addresses may be decreased. Further, the longer the event takes, the greater the likelihood that the "cyber-hygiene" associated with the communication system 600 will breakdown, thereby prompting a change in the addresses.

Further, the number of users for the communication system 600 and the number of times the users access it can also increase the likelihood of detection of the communication system 600. Further, the location of the users as they access the communication system 600 can be important. For instance, if the users are accessing the communication system 600 from company devices with known addresses, the likelihood of detection of the communication system 600 increases. The monitoring engine 602 can be programmed to monitor other criteria as well.

The example risk modeling engine 604 is programmed to receive the various criteria from the monitoring engine 602 and make a determination as to when the addresses for the communication system 600 should be changed. In one example, the risk modeling engine 604 uses AI to analyze the criteria, such as Elasticsearch from Elasticsearch B.V.

In this example, the risk modeling engine 604 is tuned to weigh each of the criteria from the monitoring engine 602 to calculate a risk score. For instance, each access of the communication system 600 by a user can be given a point score ranging from low (e.g., 0.5 points) to high (e.g., 10 points) based upon who is accessing it and from where. The points function to weight each of the criteria based upon severity.

For instance, if a user accesses the communication system 600 from an anonymous device and limits communication, only 0.5 points may be assessed by the risk modeling engine 604. However, if the user accesses the communication system 600 from a known business location numerous times, the monitoring engine 602 can assess a higher points value of 2 points per access.

Further, the risk modeling engine 604 can assess a certain number of points (e.g., per hour, per day, per week, etc.) that are dependent upon how long the communication system 600 is up and accessible. For instance, for a less-severe event, the risk modeling engine 604 can assess 0.25 points for each hour the communication system 600 is up. Conversely, the risk modeling engine 604 can assess 1 point per hour for a higher-severity event. Further, the number of points can escalate depending on the length of time.

In addition, the risk modeling engine 604 can assess threats to the communication system 600 and assign points based upon the threats. For instance, attempts to access the communication system 600 from domains known to host bad actors (e.g., .ru or .cn domains) can result in great points being added to the model by the risk modeling engine 604. Many other schemes for assessing points can be used.

The risk modeling engine 604 can sum the points to calculate a risk score and use a graduated set of thresholds (see example table below) to provide a quantitative indication of the security posture of the communication system 600. This sum can, in turn, be used to assess when to change the addressing for the communication system 600.

| Point threshold | Threat level | Description |
|---|---|---|
| 0 | Green | Low threat of detection of communication system. No action needed. |
| 50 | Yellow | Medium threat of detection. Consider possible action. |
| 100 | Red | High threat of detection. Changing of address of communication system is recommended. |

For instance, when the communication system 600 is created, the risk modeling engine 604 can indicate that the communication system 600 is at a first level (e.g., green). As the monitoring engine 602 provides criteria to the risk modeling engine 604 and the risk modeling engine 604 assesses points that increase the risk score, the point total can reach an intermediate threshold, whereupon the risk modeling engine 604 increases the threat monitoring level (e.g., to yellow). Further, as the points assessed by the risk modeling engine 604 increase past another threshold, the risk modeling engine 604 increases the threat monitoring level to red. Upon reaching the red level, the risk modeling engine 604 can cause the addressing for the communication system 600 to be changed, as described below.

The example domain provisioning engine 606 is programmed to change the addressing for the communication system 600 upon the risk modeling engine 604 indicating that such a change is necessary. This can be instituted, for example, when the points assigned by the risk modeling engine 604 reach a threshold level (e.g., red), as described above.

In one example, the domain provisioning engine 606 is generally programmed to (i) create a new address for the communication system 600 and (ii) reprovision the communication system 600 to work with the new address so that data already associated with the communication system 600 is maintained.

For instance, the domain provisioning engine 606 can provision a new IP address for the communication system 600 and create the appropriate DNS and MX entries. The IP address and DNS/MX entries can be assigned pseudo-randomly by the domain provisioning engine 606 so that tracking of the changes by bad actors is more difficult. For instance, the domain provisioning engine 606 can use a random number generator when requesting a new IP address to randomize the assignment of the new IP address. Many different configurations are possible.

In one example, the domain provisioning engine 606 can use scripting provided by Amazon Route 53 (AWS Route 53) to reassign the addressing for the various components of the communication system 600 For instance, the domain provisioning engine 606 can use scripts executed by Amazon Route 53 to create new DNS routing and load balancing for the communication system 600. This can result in a new static IP and DNS/MX entries being assigned for the communication system 600. Similar tools (e.g., Cloudflare) are provided by Google and Azure that offer this API-driven DNS functionality.

Finally, the example notification engine 608 is programmed to notify the users of the communication system 600 of the new addressing. For instance, as described further above, the domain provisioning engine 606 can send an out-of-band message (this prevents any unwanted interception of emails from man-in-the-middle attacks) to each of the users with the new addressing information for the communication system 600.

For instance, in one example, the notification engine 608 is programmed to send a text message to each user with addressing information, such as like the following.

The new address for the communication system has been moved to mail.newdomain.com. Please use a nonattributable device to access the communication system at this new address. You will need to create a new password.

Many other configurations are possible.

Figure 7:
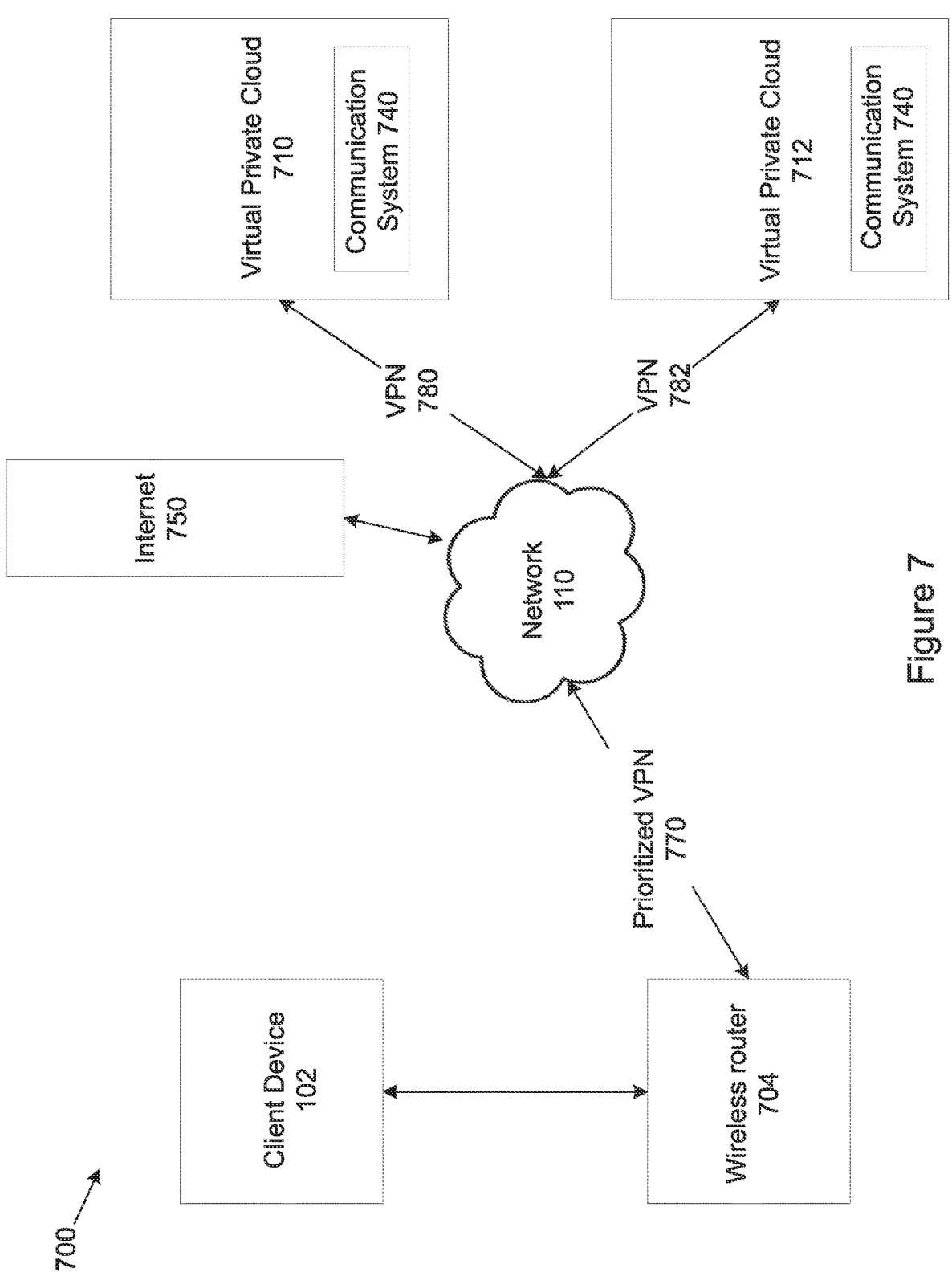
FIG. 7 shows another example system for providing temporary communication services.

Referring now to FIG. 7, another example system 700 is shown. The system 700 is similar to the system 100 provided above and includes a temporary self-provisioning communication system 740 hosted on virtual private clouds 710, 712. The communication system 740 hosted on the virtual private clouds 710, 712 is configured in a manner similar to the communication systems 200, 500, and 600 described above. However, in this instance, the system 100 is programmed to configure and automatically change the networking for the system 700 when certain predetermined criteria are met.

For instance, the system 700 can be configured with a prioritized network to assure access to communications during a cyber security event. This prioritized network, which may be provided by a service provider, can assure communications for the system 700 are prioritized above other communications on a network. For instance, when the bandwidth of the network 110 is limited (e.g., because of a crisis or increased usage), data for the system 700 is prioritized over other traffic on the network 110. This makes it more likely that the system 700 will continue to function.

One example of such a prioritized network is the Verizon Frontline advanced network from Verizon Wireless. Other providers and configurations are possible.

The system 700 can also include built-in redundancy and automate the switching of network components according to another predetermined set of criteria. This switching is described further below.

In this example, the client device 102 of the system 700 connects to the network 110 through a wireless router 704. In this embodiment, the wireless router 704 is a MiFi hotspot that connects the client device 102 to the network 110. As noted, this connection to the network 110 can be prioritized through a Virtual Private Network (VPN) 770.

In this example, another VPN tunnel 780 is provide between the network 110 and endpoints in the network, such as the virtual private clouds 710 and 712. The virtual private clouds 710, 712 provide the functionality of the communication system 740, such as the event management system 310, the chat system 312; and the mail system 314.

In these embodiments, the networking that connects the client device 102 to the network 110 and the virtual private clouds 710, 712 can be rotated automatically. To accomplish this automation, the client device 102 is configured appropriately. This can be accomplished using a VPN solution, such as a virtual private network system from OpenVPN, Inc., on both the client device 102 and the wireless router 704 to create the VPN 770. Public Key Infrastructure (PKI) certificates on both the client device 102 and the wireless router 704 are configured to match, and the installation and management of the VPN 770 can thereby be automated.

In order to create the networking configuration of the system 700, the client device 102 connects to the wireless router 704. This wireless router 704 can be provisioned to connect to the network 110. The data is routed from the wireless router 704 though the VPN 770 to the network 110. As noted, this provisioning can include priority access, so that data from the client device 102 through the wireless router 704 can be prioritized on the network 110.

At the network 110, the data can be split. Internet-based data is routed to the Internet 750, while traffic for the communication system 740 is routed through the VPN 780. The VPN 780 can provide an Internet Protocol Security (IPSec) tunnel to the virtual private cloud 710.

The network 110 is also configured to route the data through the VPN 782 to a passive backup of the communication system 740 on the virtual private cloud 712. Should the virtual private cloud 710 become compromised or otherwise unavailable, the network 110 can be configured to automatically route data from the client device 102 through the VPN 782 to the virtual private cloud 712.

In these examples, switching or rotation of the networking 110 can involve one or both of: (i) the prioritized VPN 770 between the client device 102/wireless router 704 and the network 110; and/or (ii) the VPN 780 between the network 110 and the virtual private clouds 710, 712. Rotation can be done based on the predetermined set of criteria, which are described further below.

Figure 8:
FIG. 8 shows example logical components of a network of the system of FIG. 7.

Referring now to FIG. 8, additional details on the network 110 are provided. In this example, the network 110 includes a networking engine 802 and a risk modeling engine 804.

The example networking engine 802 is programmed to create the communication infrastructure between the client device 102 and the communication system 740 on the virtual private clouds 710, 712. The network 110 can use various processes to create the VPNs and other infrastructure, such as by using the Terraform tool, as described above.

The example risk modeling engine 804 is programmed to automatically rotate networking for the system 700 based upon the predetermined set of criteria. In this example, the criteria can be based upon elapsed time and/or a risk score.

In one instance, the risk modeling engine 804 is programmed to automatically rotate one or more aspects of the network 110 at periodic intervals. This could be after each day, week, quarterly, annually, etc.

In another instance, the risk modeling engine 804 is programmed to automatically rotate one or more aspects of the network 110 when the system 700 is deemed to likely have been compromised. The risk modeling engine 804 can be programmed to monitor various aspects of the system 700 and use a scoring mechanism to determine when the system 700 is deemed to have been compromised. In some examples, the risk modeling engine 804 uses AI to perform the scoring.

For instance, the risk modeling engine 804 can monitor various aspects of the VPN connections between the client device 102 and the network 110 and score certain activities as adding to the risk of compromise. Examples of these activities include the following.

| Risk Factor | Rating (1-100) | Considerations | Data Source |
|---|---|---|---|
| IP addresses from Office of Foreign Assets Control- (OFAC) sanctioned countries | Medium, score: 30 | Determine if the percentage of total IP scanning attempts exceeds a threshold for normal "noise" associated with common internet traffic. | Open VPN Logs (Server Side), Elastic streaming logs, reverse DNS lookup to tell where the IP addresses are coming from |

-continued

| Risk Factor | Rating (1-100) | Considerations | Data Source |
|---|---|---|---|
| Known Command and Control (C&C) Servers | Medium-High, score: 80 | Isolate the entire environment and recreate a new environment when the threshold is reached. This may indicate an advanced persistent threat. | Open VPN Logs (Server Side), Elastic streaming logs, combine known lists of C&C servers from a data source of C&C servers |
| Client-Side Anomalies | Medium, score: 30 | Determine extent of anomalies. | Review of Client-Side log availability for anomaly detection |
| Failed Login Attempts | Medium-Low, score: 20 | Review to see if part of a brute force attack. Failed login attempt points will reset every 24 hours. | Elastic streaming logs, Open VPN Logs |
| Brute Force Attacks | Medium, score: 70 | Monitor persistent brute force attacks over a period of x time. | Elastic streaming logs, Open VPN Logs |

The risk modeling engine 804 can monitor various aspects of the VPN connections between the network 110 and the virtual private clouds 710, 712 and score certain activities as adding to the risk of compromise. Examples of these activities include the following.

| Risk Factor | Rating (1-100) | Considerations | Data Source |
|---|---|---|---|
| IP addresses from Office of Foreign Assets Control- (OFAC) sanctioned countries | Medium, score: 30 | Determine if the percentage of total IP scanning attempts exceeds a threshold for normal "noise" associated with common internet traffic. | Web logs, Elastic streaming logs, reverse DNS lookup to tell where the IP addresses are coming from |
| Known Command and Control (C&C) Servers | Medium-High, score: 80 | Isolate the entire environment and recreate a new environment when the threshold is reached. This may indicate an advanced persistent threat. | Weblogs, Elastic streaming logs, combine known lists of C&C servers from a data source of C&C servers |
| Enterprise IPs | Low, score: 10 | Correlate the user logon information and session information with the IP address, perform user training on the purpose and how to properly use the non-environments. | Web logs, Elastic streaming logs, reverse DNS lookup to tell where the IP addresses are coming from |
| Failed Login Attempts | Medium-Low, score: 20 | Review to see if part of a brute force attack. Failed login attempt points will reset every 24 hours. | Elastic streaming logs, application logs, LDAP logs |
| Brute Force Attacks | Medium, score: 70 | Monitor persistent brute force attacks over a period of x time. | Elastic streaming logs, application logs, LDAP logs |
| Brute Force Attacks from sanctioned countries | High, score: 90 | Monitor persistent brute force attacks over a period of x time. | Elastic streaming logs, application logs, LDAP logs, reverse DNS lookup of the location of the IP address from the attack |

The risk modeling engine 804 is programmed to monitor this predetermined set of criteria and create the risk score based upon the monitoring. For instance, the risk score can be a summation of each of the identified criteria. When the risk score reaches or exceeds a threshold, the rotation can be initiated, as described below. For instance, when the risk modeling engine 804 detects a brute force attacks (70) and failed login attempts (20) creating a total risk score of 90, and the threshold is set at 80, the risk modeling engine 804 will communicate with the networking engine 802 to automatically rotation aspects of the network 110 because the risk score of 90 exceeds the threshold of 80.

In alternative embodiments, aspects of the network 110 can also be rotated manually as desired.

Rotation of the networking can include such aspects as changing the VPN 770 or VPNs 780, 782. In other aspects, the rotation can include modifying or otherwise replacing the wireless router 704. In yet other aspects, the rotation can include moving to an entirely different network. For instance, the system 700 can move from a first network provider (e.g., Verizon Wireless) to a second network provider (e.g., AT&T Inc.).

More specifically, rotating the network provider could necessitate rotating the VPNs 770, 780 and/or replacing the wireless router 704. In addition, the VPN components could be rotated. This could be as simple as replacing a single PKI certificate on the client device 102, or replacing all the client certificates or replacing all client and server certificates.

Further, the virtual private cloud 710 could be rotated. This scenario would involve a re-Terraforming of the cloud components, reprovisioning of the IPs, etc. This may or may not require replacing the PKI infrastructure for the Open VPN.

In addition, it is possible to replace individual components of the infrastructure. For instance, only one region may be re-Terraformed, virtual machine instances may be re-Terraformed to be upgraded or moved, etc. Because the communication system 740 is flexible and modular, this is not an all or nothing system. Finally, in more serious events, the entirety of the network 110 for the system 700 can be rotated.

Further details regarding rotation of network endpoints, such as virtual private clouds, are described with reference to FIG. 9, which depicts a portion of another example system 900. In this example, only the side of the system including endpoints, depicted as virtual private clouds 910, 912, connected via respective virtual private networks 980, 982 to a network 110 and the internet 950 is depicted. However, system 900 would be similar to systems 100 and 700 described above in that one or more client devices would interface with the network 110910. At the network 110910, data can be split. Internet-based data is routed to the Internet 950, while traffic for a communication system 940 is routed through the VPN 980, 982. The VPN 980, 982 can provide an Internet Protocol Security (IPSec) tunnel to the virtual private cloud 910, 912.

The communication system 940 hosted on the virtual private clouds 910, 912 is configured in a manner similar to the communication systems 200, 500, 600 and 740 described above. VPN tunnels 980, 982 are provided between the network 110 910 and endpoints in the network, such as the virtual private clouds 910 and 912. The virtual private clouds 910, 912 provide the functionality of the communication system 940, such as the event management system 310, the chat system 312; and the mail system 314. In this instance, the system 900 is programmed to configure and automatically rotate end points in the network, such as virtual private clouds 910, 912, when certain predetermined criteria are met.

As depicted in FIG. 9, an additional virtual private network 984 may be established to enable communications and data transfer between virtual private clouds 910, 912. Although two virtual private clouds 910, 912 are depicted, any number of virtual private clouds could be present. In some embodiments, a plurality of virtual private clouds can have a hub and spoke configuration in which there is one central virtual private cloud in communication with a plurality of secondary virtual private clouds. In these embodiments, similar logic to that described above for switching of network components connecting the client device 110 to the virtual private clouds 710, 712 in FIG. 7 can be applied to provide rotation of virtual private clouds themselves in FIG. 9. This scenario may involve a re-Terraforming of the cloud components, reprovisioning of the IPs, etc. This may or may not require replacing the PKI infrastructure for the Open VPN.

Although FIG. 9 depicts endpoints as virtual private clouds 910, 912 and a virtual private network 984 between the virtual private clouds 910, 912, it should be understood that system 900 can include endpoints of other types in connection with the network 110 and/or each other, such as a virtual private cloud connected to a physical router, a virtual private cloud connected to a device running an OpenVPN, etc.

Figure 10:
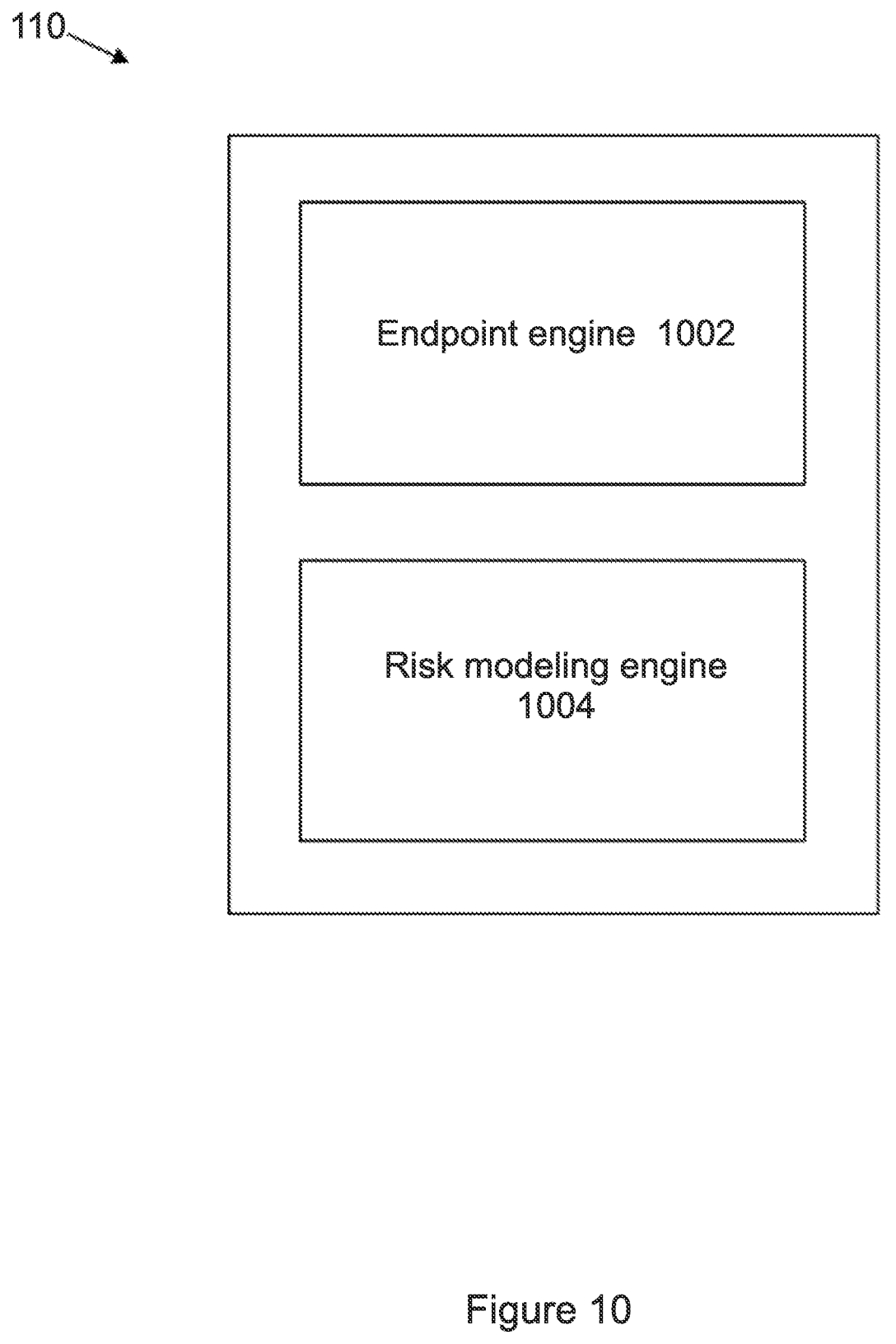

Referring now to FIG. 10, additional details on the network 110 are provided. In this example, the network 110 includes an endpoint engine 1002 and a risk modeling engine 1004.

The example endpoint engine is programmed to create the infrastructure for an endpoint in the system 900, such as the virtual private clouds 910, 912, and the communication infrastructure between the network 110 and the virtual private clouds 910, 912 or other endpoint(s). The network 110 can use various process to create the VPNs and other infrastructure, such as by using the Terraform tool, as described above.

The example risk modeling engine 1004 is programmed to rotate virtual private clouds 910, 912 or other endpoints in the system 900 based upon the predetermined set of criteria. The criteria may be based upon elapsed time and/or a risk score. Rotation can be manual or automated. Manual rotation requires building all of the components, switching PKI certifications and notifying all parties of the events that occurred.

In one instance, the risk modeling engine 1004 is programmed to automatically rotate one or more virtual private clouds or other endpoints at periodic intervals. This could be after each day, week, quarterly, annually etc.

In another instance, the risk modeling engine 1004 is programmed to automatically rotate one or more aspects of the network 110 when the system 900 is deemed likely to have been compromised. The risk modeling engine 1004 can be programmed to monitor various aspects of the system 900 and use a scoring mechanism to determine when the system 900 is deemed to have been compromised. In some examples, the risk modeling engine 1004 uses AI to perform the scoring.

For instance, risk modeling engine 1004 can monitor various aspects of the VPN connections 980, 982 between the network 110 and the virtual private clouds 910, 912 or other endpoints as well as VPN connections 984 between and among the endpoints and score certain activities as adding to the risk of compromise. Similar to the system set forth above, examples of these activities can include the following.

| Risk Factor | Rating (1-100) | Considerations | Data Source |
|---|---|---|---|
| IP addresses from Office of Foreign Assets Control-(OFAC) sanctioned countries | Medium, score: 30 | Determine if the percentage of total IP scanning attempts exceeds a threshold for normal "noise" associated with common internet traffic. | Web logs, Elastic streaming logs, reverse DNS lookup to tell where the IP addresses are coming from |
| Known Command and Control (C&C) Servers | Medium-High, score: 80 | Isolate the entire environment and recreate a new environment when the threshold is reached. This may indicate an advanced persistent threat. | Weblogs, Elastic streaming logs, combine known lists of C&C servers from a data source of C&C servers |
| Enterprise IPs | Low, score: 10 | Correlate the user logon information and session information with the IP address, perform user training on the purpose and how to properly use the non- environments. | Web logs, Elastic streaming logs, reverse DNS lookup to tell where the IP addresses are coming from |
| Failed Login Attempts | Medium-Low, score: 20 | Review to see if part of a brute force attack. Failed login attempt points will reset every 24 hours. | Elastic streaming logs, application logs, LDAP logs |
| Brute Force Attacks | Medium, score: 70 | Monitor persistent brute force attacks over a period of x time. | Elastic streaming logs, application logs, LDAP logs |
| Brute Force Attacks from sanctioned countries | High, score: 90 | Monitor persistent brute force attacks over a period of x time. | Elastic streaming logs, application logs, LDAP logs, reverse DNS lookup of the location of the IP address from the attack |

The risk modeling engine 1004 is programmed to monitor this predetermined set of criteria and create the risk score based upon the monitoring. For instance, the risk score can be a summation of each of the identified criteria. When the risk score reaches or exceeds a threshold, the rotation can be initiated, as described below. For instance, when the risk modeling engine 1004 detects brute force attacks (70) and failed long attempts (20) creating a total risk score of 90, and the threshold is set at 90, the risk modeling engine 1004 will communicate with the VPC engine 1002 to automatically rotate aspects of the virtual private clouds 910, 912 or other endpoints because the risk score of 90 exceeds the threshold of 80.

Different aspects of system 900 can be rotated independently based on the criteria for each aspect. For example, only aspects relating to networking components connecting user device 102 with the system, such as described above with respect to system 700, may need to be rotated. Alternatively, only aspects of system 900 relating to communications between network and endpoints such as virtual private clouds 910, 912 and/or between or among endpoints may need to be rotated.

In each circumstance, it is possible to replace individual components of the infrastructure. For instance, only one region may be re-Terraformed, virtual machine instances may be re-Terraformed to be upgraded or moved, etc. Because the communication systems 940 are flexible and modular, this is not an all or nothing system. In addition, in more serious events, the entirety of the network 110 for the system 900 (including those not depicted in FIG. 9 and described in more detail with regard to FIG. 7) can be rotated. In such circumstances, the entire system may automatically be re-provisioned and reinstalled.

Rotations of components connected to network via VPNs 980, 982 in system 900 can be more complicated because, as noted above, such endpoints can be disparate device types other than virtual private clouds. Changing the cloud configuration with physical devices such as routers may require manual intervention. Because such intervention may not be able to be automated, a manual notification may need to be provided and one or more manual steps be carried out with the device.

There may also be circumstances where rotation is necessary based on the risk analysis, but it is considered too risky to resume transferring data even if some or all of the components were to be rotated. In such circumstances, a complete destruction of the communication environment and underlying data can be carried out.

Figure 11:
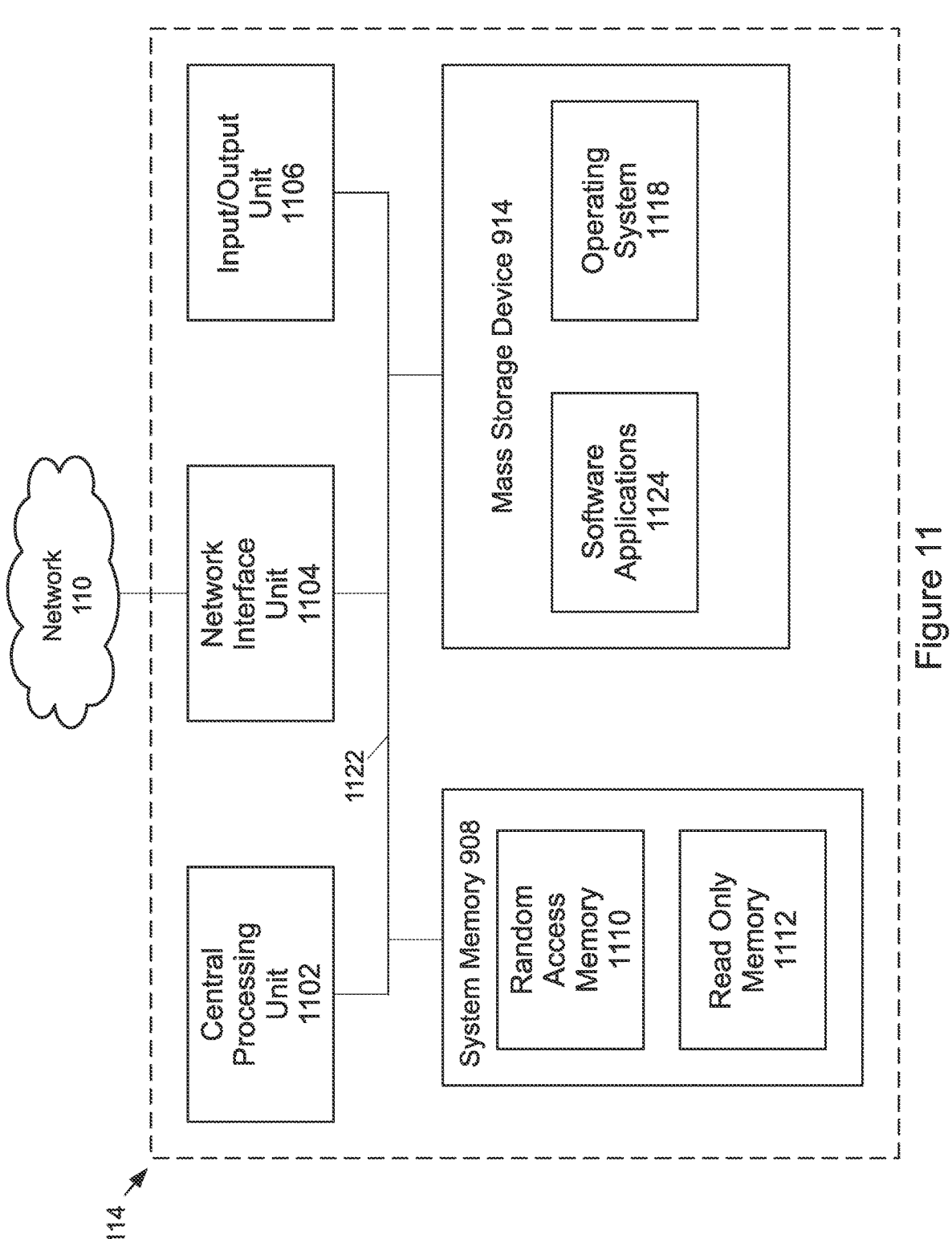
FIG. 11 shows example physical components of the communication system of FIG. 2.

As illustrated in the embodiment of FIG. 11, the example server device 114 which provides the communication services can include at least one central processing unit ("CPU") 1102, a system memory 1108, and a system bus 1122 that couples the system memory 1108 to the CPU 1102. The system memory 1108 includes a random access memory ("RAM") 1110 and a read-only memory ("ROM") 1112. A basic input/output system containing the basic routines that help transfer information between elements within the server device 114, such as during startup, is stored in the ROM 1112. The server device 114 further includes a mass storage device 1114. The mass storage device 1114 can store software instructions and data. A central processing unit, system memory, and mass storage device similar to that depicted are also included in other computing devices disclosed herein (e.g., the devices 102, 104, 106, 112, 114, 710, 712, 910, 912).

The mass storage device 1114 is connected to the CPU 1102 through a mass storage controller (not shown) connected to the system bus 1122. The mass storage device 1114 and its associated computer-readable data storage media provide non-volatile, non-transitory storage for the server device 114. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server device 114.

According to various embodiments of the invention, the server device 114 may operate in a networked environment using logical connections to remote network devices through the network 110, such as a wireless network, the Internet, or another type of network. The server device 114 may connect to the network 110 through a network interface unit 1104 connected to the system bus 1122. It should be appreciated that the network interface unit 1104 may also be utilized to connect to other types of networks and remote computing systems. The server device 114 also includes an input/output controller 1106 for receiving and processing input from a number of other devices, including a touch user interface display screen or another type of input device. Similarly, the input/output controller 1106 may provide output to a touch user interface display screen or other output devices.

As mentioned briefly above, the mass storage device 1114 and the RAM 1110 of the server device 114 can store software instructions and data. The software instructions include an operating system 1118 suitable for controlling the operation of the server device 114. The mass storage device 1114 and/or the RAM 1110 also store software instructions and applications 1124, that when executed by the CPU 1102, cause the server device 114 to provide the functionality of the server device 114 discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer system for providing a communication system, comprising:
   one or more processors; and
   non-transitory computer-readable storage media encoding instructions which, when executed by the one or more processors, cause the computer system to:
      establish a virtual private network connection between a network of the computer system and one or more endpoints of the computer system, wherein one of the one or more endpoints of the computer system is a first virtual private cloud;
      monitor criteria associated with the computer system;
      calculate a risk score associated with the communication system; and
      automatically change one of the one or more endpoints of the computer system when the risk score exceeds a threshold, including to:
         reprovision new cloud components for a second virtual private cloud, new certificates for a new virtual private network, and new network addresses for communication; and
         establish the new virtual private network between the network and the second virtual private cloud using the new cloud components, the new certificates, and the new network addresses.

2. The computer system of claim 1, wherein one of the one or more endpoints of the computer system is a physical device.

3. The computer system of claim 1, wherein the criteria are selected from one or more of: a length of time the communication system has been active; and from where the communication system is accessed.

4. The computer system of claim 1, wherein automatically changing one or more endpoints of the computer system includes permanently removing one of the one or more endpoints from the computer system.

5. The computer system of claim 1, comprising further instructions which, when executed by the one or more processors, cause the computer system to sum each of the criteria to calculate the risk score.

6. The computer system of claim 2, wherein changing one or more endpoints includes providing a notification on the physical device instructing manual intervention to change the one or more endpoints.

7. The computer system of claim 5, comprising further instructions which, when executed by the one or more processors, cause the computer system to compare the risk score to the threshold.

8. A method for providing a communication system, comprising:
   establishing a virtual private network connection between a network of a computer system and one or more endpoints of the computer system, wherein one of the one or more endpoints of the computer system is a first virtual private cloud;
   monitoring criteria associated with the computer system associated with the communication system;
   calculating a risk score associated with the communication system; and
   automatically changing one of the one or more endpoints of the computer system when the risk score exceeds a threshold, including:
      reprovisioning new cloud components for a second virtual private cloud, new certificates for a new virtual private network, and new network addresses for communication; and
      establishing the new virtual private network between the network and the second virtual private cloud using the new cloud components, the new certificates, and the new network addresses.

9. The method of claim 8, wherein one of the one or more endpoints is a physical device.

10. The method of claim 8, wherein the criteria are selected from one or more of: a length of time the communication system has been active; and from where the communication system is accessed.

11. The method of claim 8, wherein automatically changing one or more endpoints of the computer system includes permanently removing one of the one or more endpoints from the computer system.

12. The method of claim 8, further comprising summing each of the criteria to calculate the risk score.

13. The method of claim 9, wherein changing one or more endpoints includes providing a notification on the physical device instructing manual intervention to change the one or more endpoints.

14. The method of claim 12, further comprising comparing the risk score to the threshold.

* * * * *